(12) United States Patent
Haider et al.

(10) Patent No.: US 11,245,915 B1
(45) Date of Patent: Feb. 8, 2022

(54) CONVERSION BETWEEN RASTER AND CODED FORMATS

(71) Applicant: Xilinx, Inc., San Jose, CA (US)

(72) Inventors: Mujib Haider, Birmingham, MI (US); Venkata V. Dhanikonda, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/025,062

(22) Filed: Sep. 18, 2020

(51) Int. Cl.
| | |
|---|---|
| *H04N 19/423* | (2014.01) |
| *H04N 19/186* | (2014.01) |
| *H04N 19/132* | (2014.01) |
| *H04N 19/176* | (2014.01) |
| *H04N 19/136* | (2014.01) |

(52) U.S. Cl.
CPC ......... *H04N 19/423* (2014.11); *H04N 19/132* (2014.11); *H04N 19/136* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 5,889,562 | A * | 3/1999 | Pau | H04N 19/61 348/447 |
| 6,212,300 | B1 * | 4/2001 | Rengakuji | G06T 9/005 358/435 |
| 7,098,922 | B1 * | 8/2006 | Bastos | G06T 1/20 345/506 |
| 7,139,003 | B1 * | 11/2006 | Kirk | G06F 9/3836 345/531 |
| 2006/0023952 | A1 * | 2/2006 | Rai | H04N 19/44 382/232 |
| 2018/0131936 | A1 * | 5/2018 | Tang | H04N 19/159 |
| 2021/0152841 | A1 * | 5/2021 | Hu | H04N 19/105 |
| 2021/0157514 | A1 * | 5/2021 | Koo | G06F 3/0683 |

OTHER PUBLICATIONS

Douglas A. Kerr, Chrominance Subsampling in Digital Images, Jan. 19, 2012, Issue 3.
AMBA AXI and ACE Protocol Specification; ARM IHI 0022D; AXI3, AXI4, and AXI4-Lite, ACE and ACE-Lite; Copyright 2003, 2004, 2010, 2011 ARM.

(Continued)

*Primary Examiner* — Christopher G Findley
(74) *Attorney, Agent, or Firm* — Crawforrd Maunu PLLC

(57) ABSTRACT

Disclosed approaches for converting between block coded format and raster format include buffers for first type component blocks and second type component blocks of a frame. The buffers are sized less than the width of the frame. A demultiplexer circuit is configured to input the first type component blocks and the second type component blocks in coded block order, and enable storage of the first type component blocks in the first buffer and of the second type component blocks in the second buffer in the coded block order. A multiplexer circuit is configured to flush data from the first buffer in raster scan order in response to a completed set of the first type component blocks in the first buffer, and flush data from the second buffer in raster scan order in response to a completed set of the second type component blocks in the second buffer.

20 Claims, 11 Drawing Sheets

(56) References Cited

OTHER PUBLICATIONS

AMBA 4 AXI4—Stream Protocol, Specification, ARM IHI 0051A, Version 1.0, Copyright 2010 ARM.

CCITT, The International Telegraph and Telephone Consultative Committee, Terminal Equipment and Protocols For Telematic Services, Information Technology—Digital Compression and Coding of Continuous-Tone Still Images—Requirements and Guidelines, International Telecommunication Union, Sep. 1992, T.81.

ITU-T Telecommunications Standardization Sector of ITU, Series T: Terminals For Telematic Services Still-image Compression—JPEG-1 Extensions, International Telecommunication Union, May 2011, T.871.

L. Berc, et al., Memo: RTP Payload Format for JPEG-compressed Video, Network Working Group, Standards frack, Oct. 1998, Copyright The Internet Society 1998.

\* cited by examiner

FIG. 3

YUV format 4:4:4 sampling factors: H1=V1=H2=V2=H3=V3=1

YUV format 4:2:2 sampling factors: H1=V1=2, H2=H3=1, V2=V3=2

Block 208:
| Y[0,0] 0 | Y[0,1] 1 | U[0,0] 4 | V[0,0] 6 |
| Y[1,0] 2 | Y[1,1] 3 | U[1,0] 5 | V[1,0] 7 |

Block 210:
| Y[0,2] 8 | Y[0,3] 9 | U[0,1] 12 | V[0,1] 14 |
| Y[1,2] 10 | Y[1,3] 11 | U[1,1] 13 | V[1,1] 15 |

Block 212:
| Y[0,4] 16 | Y[0,5] 17 | U[0,2] 20 | V[0,2] 22 |
| Y[1,4] 18 | Y[1,5] 19 | U[1,2] 21 | V[1,2] 23 |

YUV format 4:2:0 sampling factors: H1=V1=2, H2=V2=H3=V3=1

Block 214:
| Y[0,0] 0 | Y[0,1] 1 | U[0,0] 4 | V[0,0] 5 |
| Y[1,0] 2 | Y[1,1] 3 | | |

Block 216:
| Y[0,2] 6 | Y[0,3] 7 | U[0,1] 10 | V[0,1] 11 |
| Y[1,2] 8 | Y[1,3] 9 | | |

Block 218:
| Y[0,4] 12 | Y[0,5] 13 | U[0,2] 16 | V[0,2] 17 |
| Y[1,4] 14 | Y[1,5] 15 | | |

...

Example of an SoC

CONVERSION BETWEEN RASTER AND CODED FORMATS

TECHNICAL FIELD

The disclosure generally relates to circuitry for converting pixel data between coded and raster format.

BACKGROUND

Many applications encode and decode still image data according to the ITU-T Rec T.871 standard (also referred to as "JFIF") set forth by the Joint Photographic Experts Group (JPEG) of the International Telecommunication Union (ITU).

Each pixel of an image can be described by three components. The three components include one luma value and two chrominance values. The luma value can be referred to as the Y value, and the two chrominance values can be referred to as the U, and V values. U values are sometimes referred to as "Cb" values, and V values are sometimes referred to as "Cr" values.

Chrominance subsampling can reduce hardware requirements and improve compression ratios with negligible tradeoff in visual quality due to characteristics of the human visual system. Each image pixel can be represented by an individual Y value, and one pair of U and V values. The U and V components are subsampled in the horizontal and vertical directions.

A Minimum Coded Unit (MCU) refers to a sequence of one or more data units of the image. Each data unit typically codes an 8×8, 16×8, or 16×16 block of pixels, for example. The particular sequence of the MCU depends on whether the component data units are non-interleaved or interleaved, and on the horizontal and vertical sampling factors used for each of the three components. For non-interleaved data units, the MCU is one data unit. For interleaved data, the sequence of data units depends on the horizontal and vertical sampling factors H1 and V1 of the Y component, the horizontal and vertical sampling factors H2 and V2 of the U component, and the horizontal and vertical sampling factors H3 and V3 of the V component.

Codec implementations often employ line buffers to convert between MCU and raster formats. For example, a part of a decoder circuit inputs MCUs, writes the component values to line buffers, and outputs the component values from the line buffers in raster scan order. The memory requirements of line buffers can be substantial, however. For example, for 8×8 blocks and a luma vertical sampling factor of 4, 32 line buffers would be required (4*8=32), and each line buffer would be sized based on a maximum supported resolution. An application that supports up to 3840×2160 pixel resolution would require 32, 8-bit wide line buffers; each line buffer being 3840 words deep. Separate line buffers to support the U and V components would require additional memory resources. In an implementation targeted to a field programmable gate array having limited on-chip memory resources, the memory requirements of the line buffers can constrain the number of codecs that can be implemented on the device. In addition, bus interconnects may require additional large buffers to accommodate data transmitted in bursts from the line buffers. Large bursts can also result in undesirable levels of latency.

SUMMARY

A disclosed circuit arrangement includes a first buffer configured for storage of M rows and N columns of first type component blocks of a frame. M=a first vertical sampling factor, N=L*(a first horizontal sampling factor), L≥2, N<W, and W is a number of columns of blocks of pixels in the frame. A second buffer is configured for storage of a plurality of second type component blocks of the frame. A demultiplexer circuit is configured to input the first type component blocks and the second type component blocks in coded block order. The demultiplexer circuit is configured to enable storage of the first type component blocks in the first buffer and of the second type component blocks in the second buffer in the coded block order. A multiplexer circuit is configured to flush data from the first buffer in raster scan order in response to a completed set of the first type component blocks in the first buffer. The multiplexer circuit is configured to flush data from the second buffer in raster scan order in response to a completed set of the second type component blocks in the second buffer.

Another disclosed circuit arrangement includes a first buffer and a second buffer. The first buffer is configured for storage of M rows and N columns of first type component blocks of first type component data of a frame. M=a vertical sampling factor, N=L*(a horizontal sampling factor), L≥2, N<W, and W is a number of columns of blocks of pixels in the frame. The second buffer is configured for storage of a plurality of second type component blocks of second type component data of the frame. A demultiplexer circuit is configured to input in raster scan order, the first type component data and the second type component data. The demultiplexer circuit is configured to enable storage in raster scan order of the first type component data in the first buffer, and enable storage in raster scan order of the second type component data in the second buffer. A multiplexer circuit is configured to flush data from the first buffer and from the second buffer in coded block order.

A disclosed method includes inputting first type component blocks and second type component blocks in a coded block order to a demultiplexer circuit. The first buffer is configured for storage of M rows and N columns of the first type component blocks of a frame. M=a first vertical sampling factor, N=L*(a first horizontal sampling factor), L≥2, N<W, and W is a number of columns of blocks of pixels in the frame. The method includes enabling storage of the first type component blocks in the first buffer and of the second type component blocks in the second buffer in the coded block order by the demultiplexer circuit. The method includes flushing data from the first buffer by a multiplexer circuit in raster scan order in response to a completed set of the first type component blocks in the first buffer. The multiplexer circuit flushes data from the second buffer by in raster scan order in response to a completed set of the second type component blocks in the second buffer.

Other features will be recognized from consideration of the Detailed Description and Claims, which follow.

BRIEF DESCRIPTION OF THE DRAWINGS

Various aspects and features of the circuit arrangements and methods will become apparent upon review of the following detailed description and upon reference to the drawings in which:

FIG. 3 shows a sequence of three interleaved MCUs according to horizontal and vertical sampling factors for all three components being 1;

FIG. 4 shows a sequence of three interleaved MCUs according to Y sampling factors H1=2 and V1=2, U sampling factors H2=1 and V2=2, and V sampling factors H3=1 and V3=2;

FIG. 5 shows a sequence of three interleaved according to Y sampling factors H1=2 and V1=2, U sampling factors H2=1 and V2=1, and V sampling factors H3=1 and V3=1;

DETAILED DESCRIPTION

Figure 1:
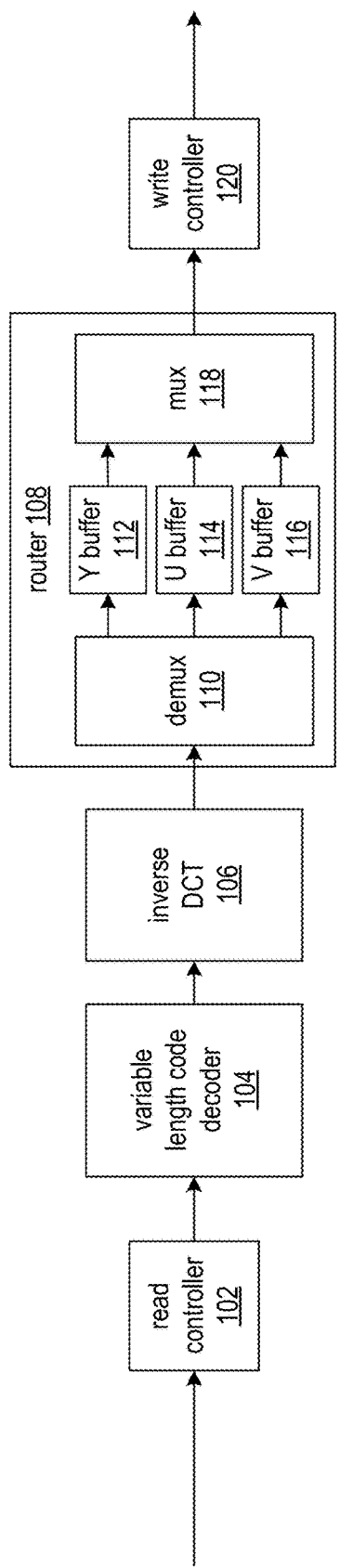
FIG. 1 shows an exemplary decoder circuit.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches can be applied to either frames of video or still image data. Though exemplary circuits and methods are described relative to a YUV color model, it will be recognized that the disclosed buffering and strided raster scan techniques can be adapted to other color models (e.g., CIE, RGB, HSL/HSV, and CMYK), as well as to applications involving only two components or more than three components.

In the exemplary circuit arrangements, an MCU buffer architecture supports the JPEG baseline profile of ITU-T Rec T.81. The circuit arrangements provide storage and orchestration of MCUs for either interleaved or non-interleaved scan formats and use a strided raster-scan technique to efficiently burst MCUs to memory while reducing on-chip buffering. The buffer architecture with strided raster-scans reduces hardware memory requirements by up to 90% while achieving high throughput efficiency to memory controllers.

The disclosed circuits and methods include and involve at least a first buffer and a second buffer. The first buffer is configured for storage of first type component blocks of a frame, and second buffer is configured for storage of second type component blocks of a frame. Other embodiments can include additional buffers for storage of additional component types of image data. The first buffer has storage for M rows and N columns of blocks of the first type component. M is equal to a vertical sampling factor, and N is a multiple of a horizontal sampling factor. Notably, N is less than the number of columns of blocks of pixels in the frame. The second buffer provides storage for blocks of the second component type and can also have M rows and N columns, or fewer rows and/or columns depending on application requirements.

The circuits and methods also include and involve a demultiplexer circuit and a multiplexer circuit coupled to the first and second buffers. The demultiplexer circuit is configured to input the first type component blocks and the second type component blocks in coded block order (e.g., MCU order), and to enable storage of the first type component blocks in the first buffer and of the second type component blocks in the second buffer. The multiplexer circuit is configured to flush elements from the first buffer in raster scan order in response to a completed set of the first type component blocks in the first buffer, and to flush elements from the second buffer in raster scan order in response to a completed set of the second type component blocks in the second buffer.

The flushing of the data from the first and second buffers is in raster scan order (row-by-row) relative to the buffers, but is a strided raster scan relative to the overall frame. As the buffers have fewer columns of blocks than there are columns of blocks in the frame, a row of data from the buffers does not fill the entire row of the frame. Thus, frame-relative addressing of the data from successive rows of each buffer would stride by the width of the frame though each row of the buffer fills only a partial row of the frame.

FIG. 1 shows an exemplary decoder circuit. The read controller 102 is the most upstream module in the pipeline. The read controller can read encoded image data from memory over a memory mapped interface in read bursts in a contiguous fashion. Read (and write) bursts minimize transaction overhead and increase overall throughput. Data from read bursts can be buffered in a first-in-first-out (FIFO) buffer (not shown) of the read controller. The variable length code decoder circuit 104 decodes the DC coefficient and AC coefficients from coded data, extracts the magnitude, and expands the run-length code into a complete 8×8 block. The inverse DCT circuit 106 performs de-quantization and inverse Discrete Cosine Transform (DCT) to formulate the raw 8×8 block of data, which is output as an 8×8 block of the raw image data in MCU order. The output from the inverse DCT circuit provides no information to indicate the MCU structure or overall image structure.

The router circuit 108 tags data blocks from the inverse DCT circuit 106 with MCU position information. The demultiplexer 110 uses the MCU position information to selectively write the data blocks into the appropriate one of the buffers 112, 114, or 116. Each of the buffers 112, 114, and 116 stores data of one of the components of the implemented color model. In the example, the components are Y, U, and V values.

In response to a completed set of blocks in a buffer, the multiplexer 118 will commence flushing the contents of the buffer in raster scan order to the write controller 120. A complete set of blocks can be indicated by the buffer being full. In an application in which the width of the frame in blocks is not a whole number multiple of the width of the buffer in blocks (e.g., FIG. 7), a completed set of blocks can include blocks of image data and "padding" blocks, which are not part of the image.

After a buffer has been completely flushed, the multiplexer transitions to the next buffer having a complete set of blocks. The multiplexer flushes buffers in a generally round-robin fashion.

The write controller 120 writes data from the multiplexer in burst mode over a memory mapped interface. In an exemplary implementation, the width of rows in the buffers can be matched to the burst size (e.g., 64 bytes) to efficiently move data while reducing buffering within the decoder, as well as reducing buffering in the interconnect between the write controller and target memory (not shown). In burst mode, write transactions can increase throughput by combining data that could be written in multiple transactions into a single transaction, thereby reducing transaction overhead.

Figure 2:
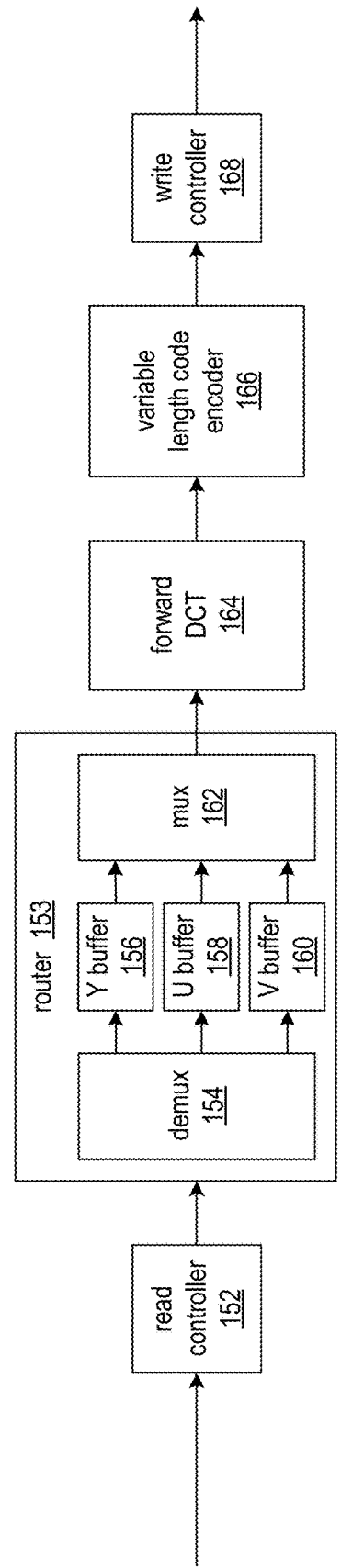
FIG. 2 shows an exemplary encoder circuit.

FIG. 2 shows an exemplary encoder circuit which performs operations mostly symmetric to the decoder circuit, but in reverse order. The read controller 152 can read raw image data in strided raster scan order from memory over a memory mapped interface in read bursts in a contiguous fashion. The read controller 152 interleaves components Y, U, and V in a round robin fashion. Arbitration occurs after a complete component buffer 156, 158, or 160 has been read over the memory mapped interface. Data from read bursts can be buffered in a first-in-first-out (FIFO) buffer (not shown) of the read controller.

The router 153 includes demultiplexer circuit 154, buffers 156, 168, and 160, and multiplexer circuit 162. The demultiplexer circuit 154 inputs the image data in the order received from the read controller 152, and based on the component type of the image data, the demultiplexer selects one of the buffers 156, 158, or 160, and stores the data in the selected buffer.

The multiplexer 162 flushes data from the buffers 156, 158, and 160 in coded block order (e.g., MCU) to the forward DCT circuit 164. Data from the buffers is grouped such that a balanced proportion of each component is fed to the forward DCT circuit 164 in coded block order.

The forward DCT circuit 164 and the variable length code encoder circuit 166 encode the raw image data in the blocks from the multiplexer and provide the encoded data to the write controller 168.

FIGS. 3, 4, and 5 show examples of sequences of MCUs according to common combinations of sampling factors for Y, U, and V components. The MCU parameters for an interleaved scan include a pair of horizontal and vertical sampling factors for each component. The sampling factors determine the MCU dimensions for each component and typically have values of 1, 2, or 4.

Applications often employ sampling factors that minimize size of the MCU in order to reduce buffering, and thereby reduce latency per MCU. However, for prior decoders that use line buffers designed to handle all valid combinations of sampling factors, the memory requirements create challenges to implementation. The disclosed circuits and methods can adapt to different combinations of sampling factors through input of values of the sampling factors to the router while requiring significantly fewer memory resources than prior approaches.

FIG. 3 shows a sequence of three interleaved MCUs 202, 204, and 206 according to horizontal and vertical sampling factors for all three components being 1.

FIG. 4 shows a sequence of three interleaved MCUs 208, 210, and 212 according to Y sampling factors H1=2 and V1=2, U sampling factors H2=1 and V2=2, and V sampling factors H3=1 and V3=2.

FIG. 5 shows a sequence of three interleaved MCUs 214, 216, and 218 according to Y sampling factors H1=2 and V1=2, U sampling factors H2=1 and V2=1, and V sampling factors H3=1 and V3=1.

Each block represents an array of component values describing a group of pixels in the image. Each block of an MCU can be an 8×8 array of values, for example. The notation in each block indicates the component, row and column block indices in an MCU buffer, and a sequence number. For example, in FIG. 4, block Y[1,1] has Y component values that are stored in a Y buffer at block-row index 1, block-column index 1, and the block Y[1,1] is the fourth block (sequence numbers counted as 0, 1, 2, 3, . . . ) provided for de-interleaving in decoding. For the router 153 in the encoder of FIG. 2, the sequence number indicates the coded block order that the multiplexer 162 flushes data from the buffers 156, 158, and 160 for processing by the forward DCT circuit 164.

The sampling factors determine the horizontal and vertical dimensions per component of the MCU in units of 8×8 blocks. In FIG. 3, the horizontal and vertical sampling factors of the Y, U, and V components are all 1. Thus, the dimensions of the Y, U, and V components of the MCU are 1×1 (1 row and 1 column).

In FIG. 4, Y sampling factors are H1=2 and V1=2, the U sampling factors are H2=1 and V2=2, and the V sampling factors are H3=1 and V3=2. Note that the horizontal sampling factors indicate the number of columns, and the vertical sampling factors indicate the number of rows. The dimensions of the Y component data are 2×2 (2 rows by 2 columns), and the dimensions of the U and V component data are both 2×1 (2 rows by 1 column).

In FIG. 5, the Y sampling factors are H1=2 and V1=2, the U sampling factors are H2=1 and V2=1, and the V sampling factors are H3=1 and V3=1. The dimensions of the Y component data are 2×2 (2 rows by 2 columns), and the dimensions of the U and V component data are both 1×1 (1 row by 1 column).

Figure 6:
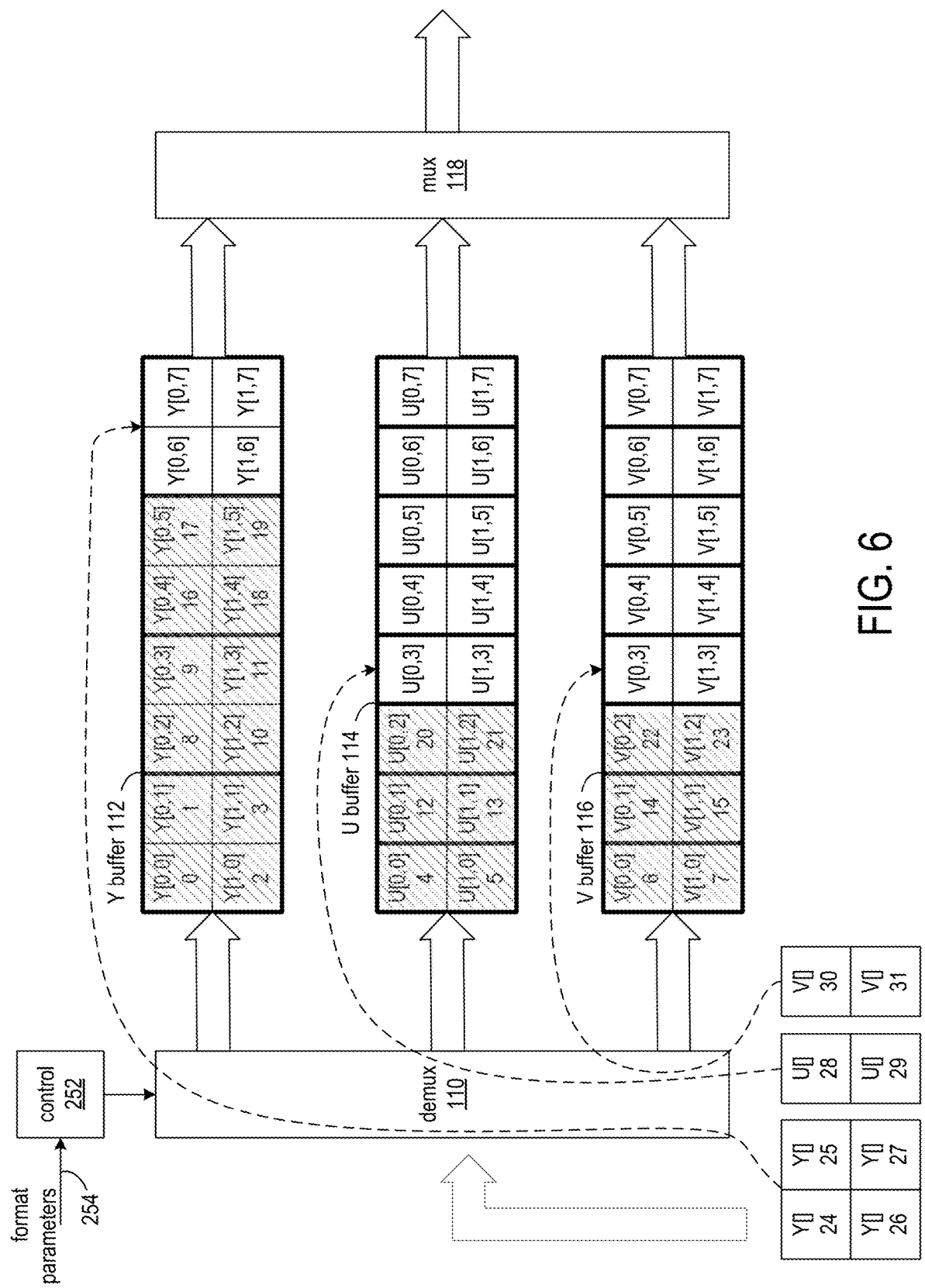
FIG. 6 shows operation of the de-multiplexer of the router circuit on input MCUs resulting from the sampling factors exemplified in FIG. 4.

FIG. 6 shows operation of the de-multiplexer of the router circuit 108 on input MCUs resulting from the sampling factors exemplified in FIG. 4, (i.e., H1=2, V1=2, H2=1, V2=2, H3=1, and V3=2). FIG. 6 shows the mapping of MCUs onto the component buffers 112, 114, and 116. The exemplary sampling factors result in half the number of each of the chroma type blocks horizontally relative to the number of luma type blocks. In the example, the Y buffer 112 fills at twice the rate of the U and V buffers 114 and 116.

The control circuit 252 provides control signals to the demultiplexer circuit 110 to control writing of the component data to the proper one of the buffers 112, 114, and 116 at the proper addresses. The control circuit generates the control signals in response to the format parameters 254, which indicate the sampling factors for the component types of the data. The format parameters can be stored in re-writeable registers (not shown) to make the router circuitry 108 and 153 configurable to accommodate different sampling factors for different applications. The control circuit can output a horizontal count, a vertical count, a channel count, and a done signal to indicate a completed MCU. The vertical count, horizontal count, and channel count are used by the demultiplexer circuit 110 in addressing the buffers 112, 114, and 116.

In each of the buffers, the gray diagonal filled blocks indicate portions of the buffers in which component data has been stored but not yet flushed by the multiplexer 118. The white filled blocks indicate portions of the buffers available for storage of incoming component data. The sequence numbers in the blocks indicate the order in which blocks of the buffers are populated with component data. In the example sequence of MCUs, the order in which blocks of the MCUs are stored in the blocks of the Y, U, and V buffers is Y[0,0], Y[0,1], Y[1,0], Y[1,1], U[0,1], U[1,0], V[0,0], V[1,0], Y[0,2], Y[0,3], etc.

The last buffer block filled in the example is V buffer block V[1,2], and the next MCU input to the demultiplexer circuit 110 include, in coded block order, Y, U, and V blocks having sequence numbers 24-31. The demultiplexer circuit enables storage of the blocks in the buffers 112, 114, and 116 in coded block order. The component values of Y[ ]-block 24 are stored at Y[0,6] of the Y buffer 112, Y[ ]-block 25 at Y[0,7], Y[ ]-block 26 at Y[1,6], Y[ ]-block 27 at Y[1,7], U[ ]-block 28 at U[0,3] of the U buffer 114, U[ ]-block 29 at U[1,3], V[ ]-block 30 at V[0,3] of the V buffer 116, and V[ ]-block 31 at V[1,3].

Figure 7:
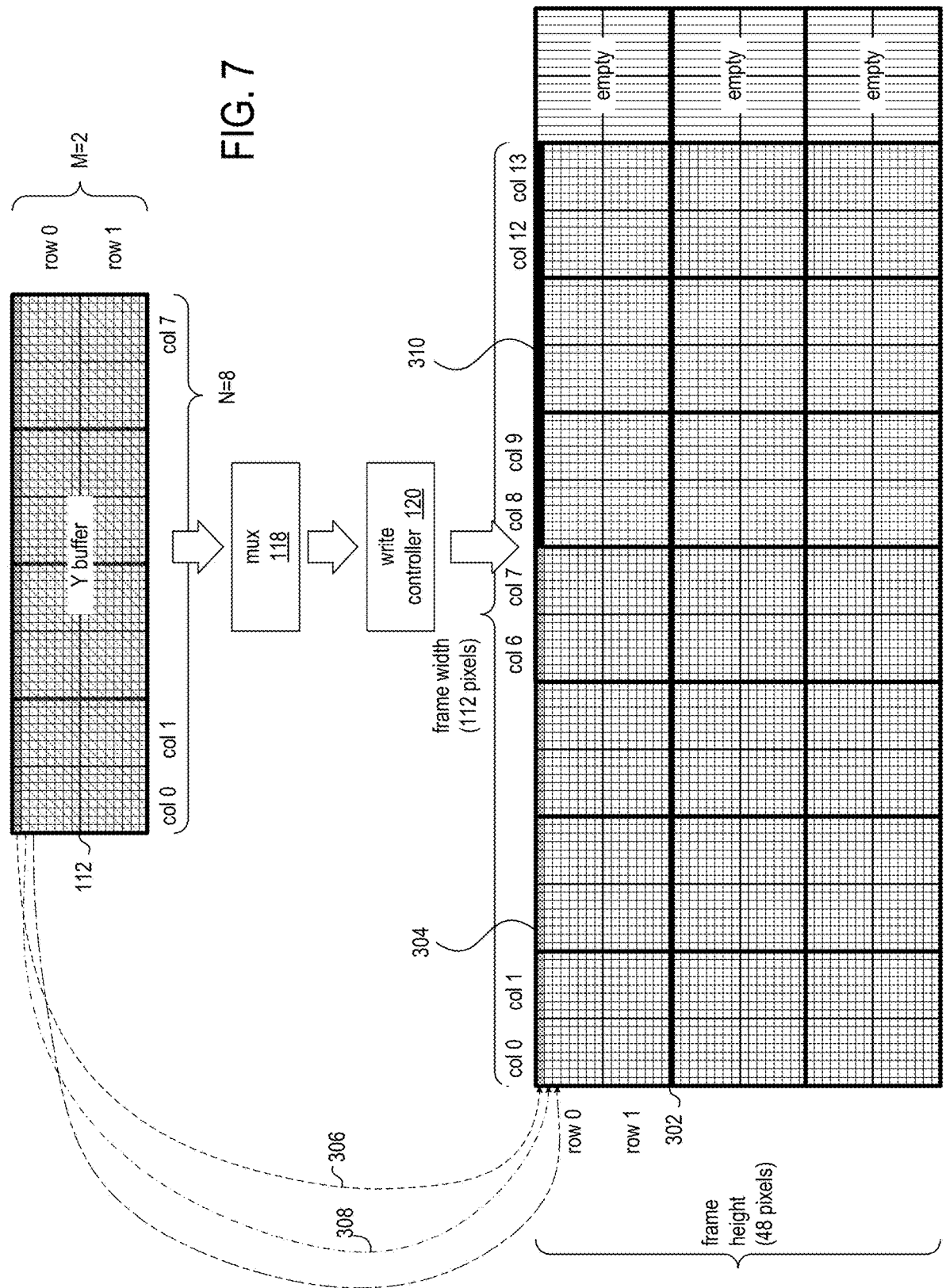
FIG. 7 shows the flushing of the MCU buffer for the Y component in raster scan order, and writing of the Y component values to a portion of memory used for the Y component of a frame.

The positions of the blocks in each buffer also illustrate the addressing of the component values of the blocks, which can be seen in greater detail in FIG. 7. For example, each of the blocks can have 64 component values of an 8×8 block referenced in row-major order. The component values of row 0 of blocks Y[0,0], Y[0,1], Y[0,2], Y[0,3], Y[0,4], Y[0,5], Y[0,6], Y[0,7] are stored in contiguous address space of the Y buffer 112, followed by the component values of rows 1-7 of those blocks, followed by rows 0-7 of blocks Y[1,0], Y[1,1], Y[1,2], Y[1,3], Y[1,4], Y[1,5], Y[1,6], Y[1,7].

The dimensions (rows and columns of blocks) of the buffers 112, 114, and 116 are based on the sampling factors and a desired write burst length. The dimensions of the buffers can be the same if support is desired for component types having equal sampling factors. The component buffers can be sized according to worst-case MCU dimensions if needed by an application. The MCU dimensions are a function of the maximum horizontal and vertical sampling factors. For the JPEG baseline profile, the maximum sampling factor is 4. To accommodate the maximum sampling factors, the buffer(s) should be sized so that the vertical dimension is 4 rows of blocks and the horizontal dimension is a multiple of 4 columns of blocks. The buffers can be sized such that the width of the frame in blocks is a multiple of the width of the buffers in blocks. Possible buffer configurations include 4×4, 4×8, 4×12, 4×16, etc. Increasing the vertical dimension beyond 4 may have no advantage while increasing the horizontal dimension can improve burst efficiency at the expense of memory circuit area. The 4×8 configuration has been found to be effective in balancing area and performance, recognizing that depending on the particular sampling factors for a particular application, the MCU buffers may not be fully utilized at runtime.

The multiplexer circuit 118 includes logic that flushes elements from the buffers in raster scan order in response to completed sets of component blocks. The multiplexer circuit commences flushing a buffer after the demultipexer 110 has written the last block into the buffer, as signaled by a "last" input signal (e.g., FIG. 8, #366). Once a buffer has been flushed, arbitration logic (not shown) of the multiplexer circuit searches for an available buffer, which can be signaled by a deasserted empty signal (e.g., FIG. 8, #378), and continues until the complete frame has been processed and all buffers have been flushed. The multiplexer arbitration logic can skip a component buffer and continue to search across the buffers sequentially until a non-empty buffer is encountered. However, in operation components will be flushed in Y, U, V order due to the cadence of the input.

FIG. 7 shows the flushing of the MCU buffer 112 for the Y component in raster scan order, and writing of the Y component values to a portion of memory 302 used for the Y component of a frame. The example is of sampling factors H1=V1=2, H2=H3=1, and V2=V3=2, and storage of the component values is in YUV planar format in the memory. The Y buffer has 2 rows and 8 columns of blocks of Y component data.

Once a complete set of blocks is present in the buffer, the rows of the buffer are flushed sequentially. Note that the flushing of a "row" from the buffer refers to the same row of component values within a row of blocks of the buffer. Each block is composed of rows and columns of component values/elements. Each row of data is provided to the write controller, and the write controller issues a burst mode write transaction with that row of data. For the 2×8 buffer configuration, for example, the burst length can be 64 bytes, with up to 16 back-to-back bursts. The MCU buffer can be sized to achieve a desirable tradeoff between performance (i.e. burst length) and memory area, recognizing that longer bursts are more efficiently transported by the write controller.

The example of FIG. 7 illustrates mapping of the contents of the Y buffer to memory for a 112×48 (width×height) pixel frame. The multiplexer flushes the buffer in row order across adjacent blocks in the form of a strided raster-scan. Because the width of the buffer (8 blocks) is less than the width of the frame (14 blocks), the raster scan flushing of rows from the buffer is strided. For example, the values in the contiguous addresses covered by the gray bar ("scan row" 0) in block row 0 of the buffer 112 are flushed and stored in contiguous addresses covered by the gray bar 304 of the memory 302. Dashed line 306 indicates the mapping of scan row 0 to the contiguous address space of the memory. Scan row 1 of the buffer is flushed and stored in contiguous addresses in the row below the gray bar as indicated by dashed line 308. The start address at which scan row 1 is stored is offset from the address at which scan row 0 is stored by the stride. The write controller 120 uses the stride to manage start addresses for write burst transactions. In some implementations, the stride can be equal to the frame width.

The initial set of blocks of a frame flushed from the buffer 112 and stored in the memory would occupy block columns 0-7 of block rows 0-1 of the memory. In flushing the next set of blocks of the frame from the buffer and storing in the memory, scan row 0 of the buffer would be stored at the addresses covered by the black bar 310.

In some instances, the frame width in blocks may not be a whole number multiple of the buffer width in blocks, such as in the example. The buffer width in the example is 8 blocks, the frame width is 14 blocks, and 14 is not a whole number multiple of 8. Thus, in the example the first 8 columns Y-component blocks of the frame would fully occupy the Y buffer 112. The next complete set of Y-component blocks would represent columns 8-13 of the frame, and therefore occupy only columns 0-5 of the buffer 112, leaving block columns 6 and 7 of the buffer filled with padding values or values that are ignored. Thus, the buffer 112 has a complete set of blocks when either the buffer is full, or the number of columns of empty (or "padding") blocks in the buffer is equal to the width of the frame in blocks modulo the number of block columns in the buffer. The "empty" blocks in the memory illustrate a frame width that is not a multiple of the buffer width, but do not necessarily correspond to actual memory address space having no frame data. That is, the address of the first value in frame row 1 can be contiguous with the address of the last value in frame row 0.

Figure 8:
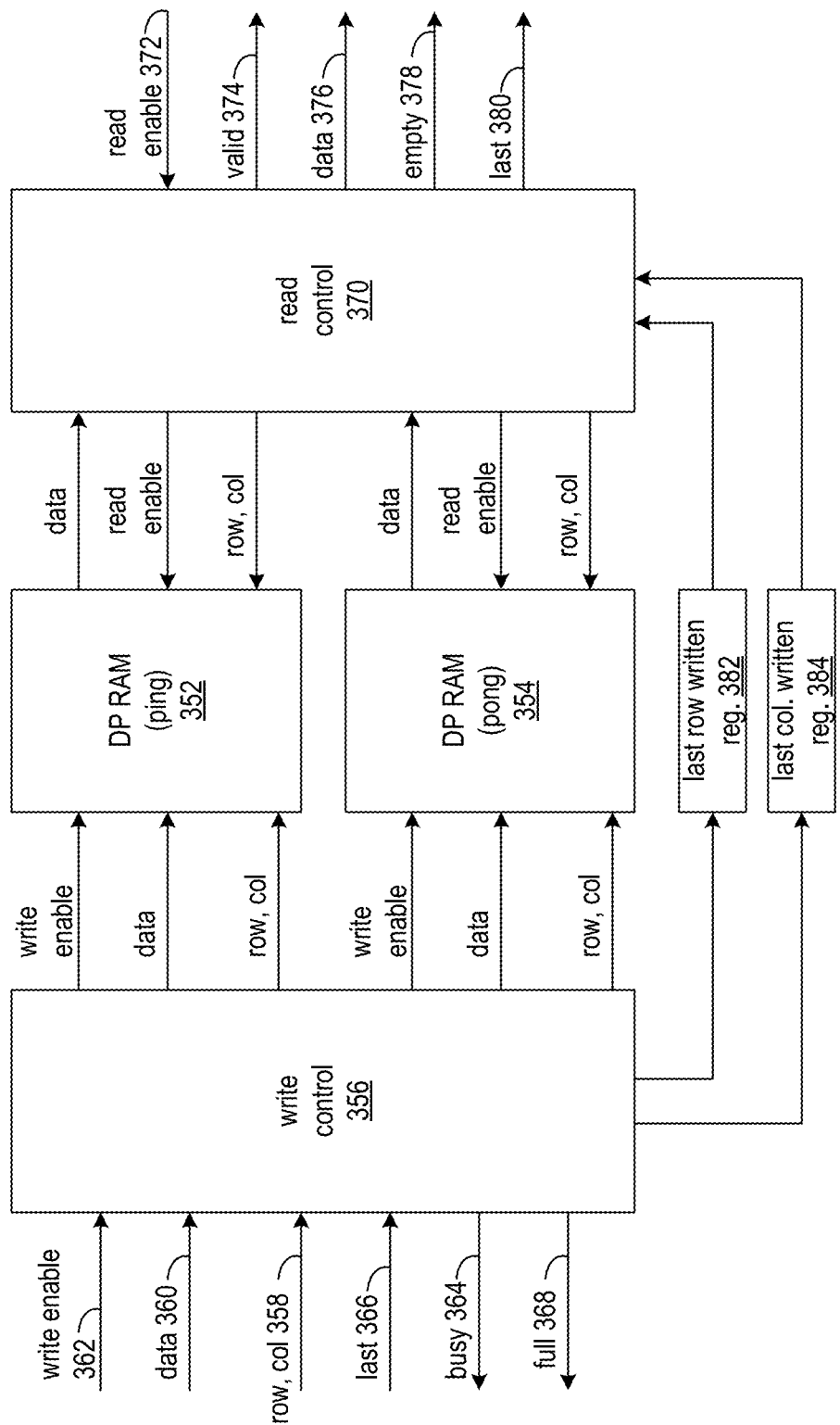
FIG. 8 is a circuit diagram of buffer circuitry for a component buffer as shown in FIG. 6.

FIG. 8 is a circuit diagram of buffer circuitry for a component buffer. Each buffer has two dual-port RAMs 352 and 354, which are operated in ping-pong fashion. This approach improves throughput by allowing new blocks to be written to one of the RAMs while rows are being flushed from the other RAM. The dual-port RAMs provide storage for a configurable two-dimensional array of blocks. The RAMs can be sized to account for the worst case MCU of 4×4 blocks. The number of columns determines the burst size to memory. In practice, each dual-port RAM is configured with M=4 and N=8 (i.e. 4×8) to support all sampling formats. In general, the buffer can be sized with M=4 and N=4*L, where L is selected according to the desired the burst length.

The write side of the buffer circuitry presents blocks of data (e.g., 8×8 blocks) to the write control circuit 356. The row and column signals 358 block in the buffer RAM being written (i.e., B[0,0]). The write control circuit writes the data 360 into the RAM in response to assertion of the enable signal 362. The busy signal 364 indicates a latency (e.g., 8 clock cycles) required to write a complete block into a RAM. The last signal 366 is asserted coincident with write enable signal to indicate the last block to be written before the buffer is available for reading. The write control circuit provides write enable, data, and row, column signals to the one of the RAMs 352 and 354 being written to, and after the last block has been written in response to the last signal, the write control circuit switches to writing to the other one of the RAMs. The write control circuit 356 asserts the full signal 368 in response to filling one of the RAMs and the read control circuit 370 not having completed reading from the other one of the RAMs.

The read control circuit 370 is aware of the last block written to the buffer. The last row and last column written by the write control circuit 356 are indicated by values stored by the write control circuit in the last row written register 382 and last column written register 384, respectively. The read control circuit 370 asserts the last signal 380 in response to the row/col., signals input to the ping/pong RAMs 352, 354 being equal to the values read by the read control circuit from the registers 382 and 384.

In response to each assertion of the read enable signal 372, the read control circuit reads a scan row within a block (e.g., row 0 of B[0,0]) across all blocks by asserting the read enable signal to one of the RAMs 352 or 354 and configuring the row and column signals. Once a complete scan row has been read, the read control circuit advances to the next scan row in the RAM. After reading the last scan row in the RAM, the read control circuit can commence reading from the other one of the RAMs once the write control circuit 356 has completed writing to that RAM. The read control circuit asserts the valid signal 374 when valid data signals 376 are present. The read control circuit asserts the empty signal 378 when both RAMs are empty, and asserts the last signal 380 when the last element of the last scan row of a RAM has been read.

The latency on the write side is balanced with the latency on the read side to flush an entire scan row.

Figure 9:
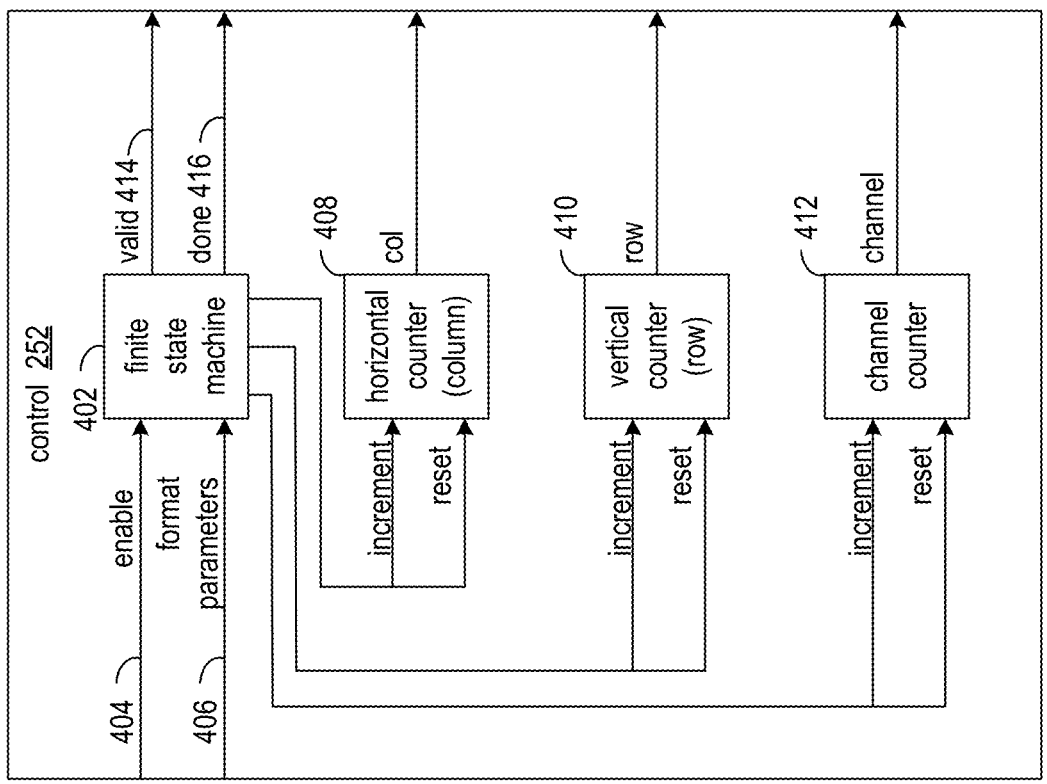
FIG. 9 is a circuit diagram of the control circuit that controls the de-multiplexer circuit of the router.

FIG. 9 is a circuit diagram of the control circuit 252 that controls the de-multiplexer 110 circuit of the router 108. The control circuit includes a finite state machine 402 that controls three counter circuits in response to an enable signal 404 and format parameter signals 406. The horizontal counter 408 counts MCU block columns, the vertical counter 410 counts MCU block rows, and the channel counter 412 counts the channel for indicating which of the buffers 112, 114, or 116 the MCU is to be stored. The format parameters indicate the sampling factors for the components (or "channels") of the image data, and the enable signal is asserted to indicate that an MCU is ready for input and storage in one of the buffers 112, 114, or 116.

The finite state machine asserts separate increment and reset signals to each of the counters to increment the counters at the appropriate time and to reset when counting for the current the MCU is complete. The finite state machine asserts the valid signal 414 to indicate that column, row, and channel signals are valid. The finite state machine 402 asserts the done signal 414 to indicate when an MCU is complete. The demultiplexer circuit 110 can register the MCU-relative count values, which are used to calculate buffer-relative addressing for storing the MCU blocks.

Figure 10:
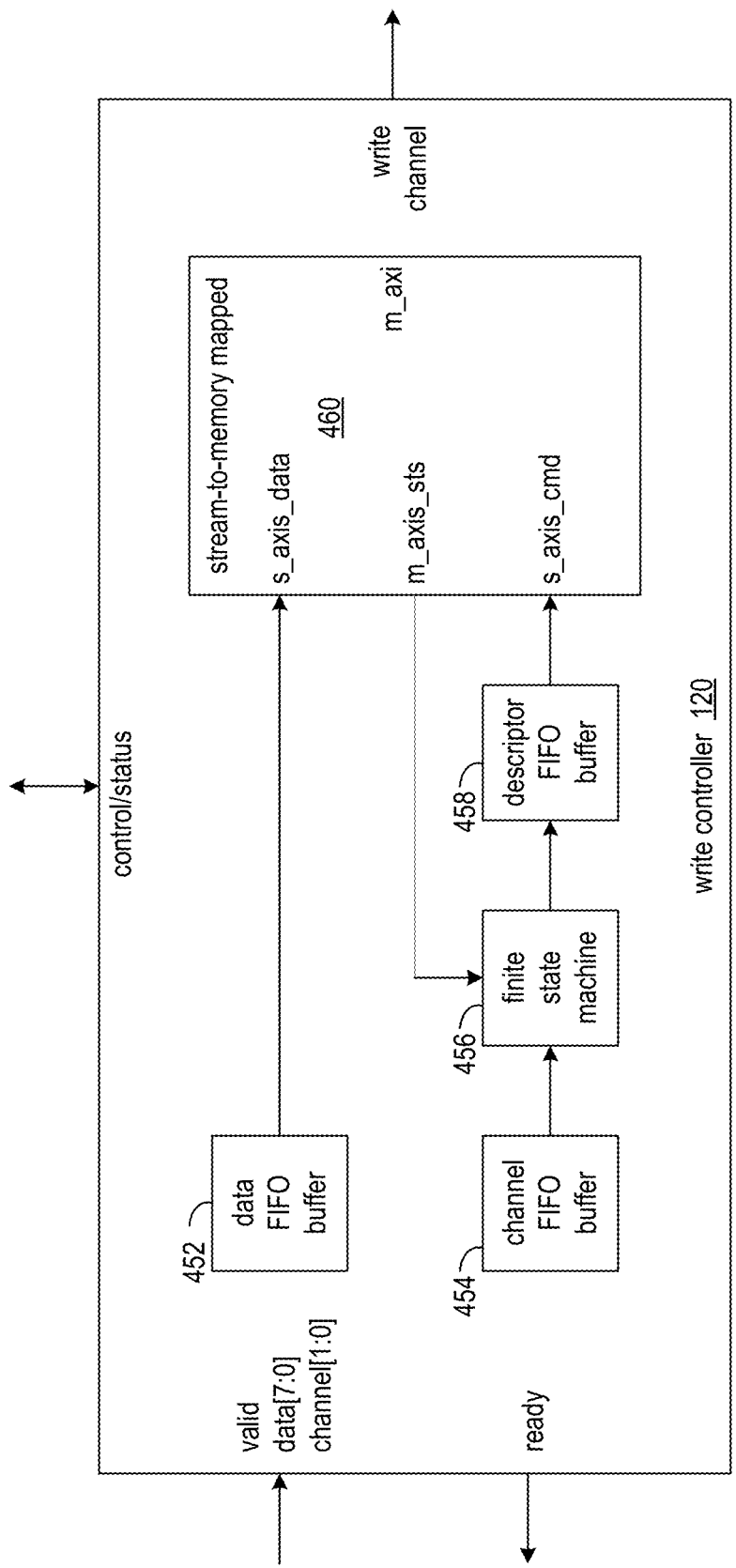
FIG. 10 is a circuit diagram of the write controller that prepares memory mapped write transactions from component elements flushed from the component buffers.

FIG. 10 is a circuit diagram of the write controller 120 that prepares memory mapped write transactions from component elements flushed from the component buffers. The write controller asserts a ready signal to the multiplexer circuit to indicate that the write controller is available to issue a memory mapped DMA write transaction. The write controller, in response to assertion of an input valid signal, stores input data in the data FIFO buffer circuit 452 and stores a channel identifier in the channel FIFO buffer 454 to indicate the channel described by the image data in data FIFO buffer. The finite state machine 456 generates and stores descriptor information in FIFO buffer 458. The descriptor information contains the information for a memory mapped write command based on the width and height of the frame and the stride.

The converter circuit 460 generates memory mapped burst mode write transactions based on streamed data from the FIFO buffer 452 and the descriptor information 458. In an exemplary implementation, the converter circuit generates write transactions over an Advanced eXtensible Interface (AXI) bus. The converter circuit outputs a status signal to the finite state machine 456 to indicate an acknowledgement from the write channel.

Figure 11:
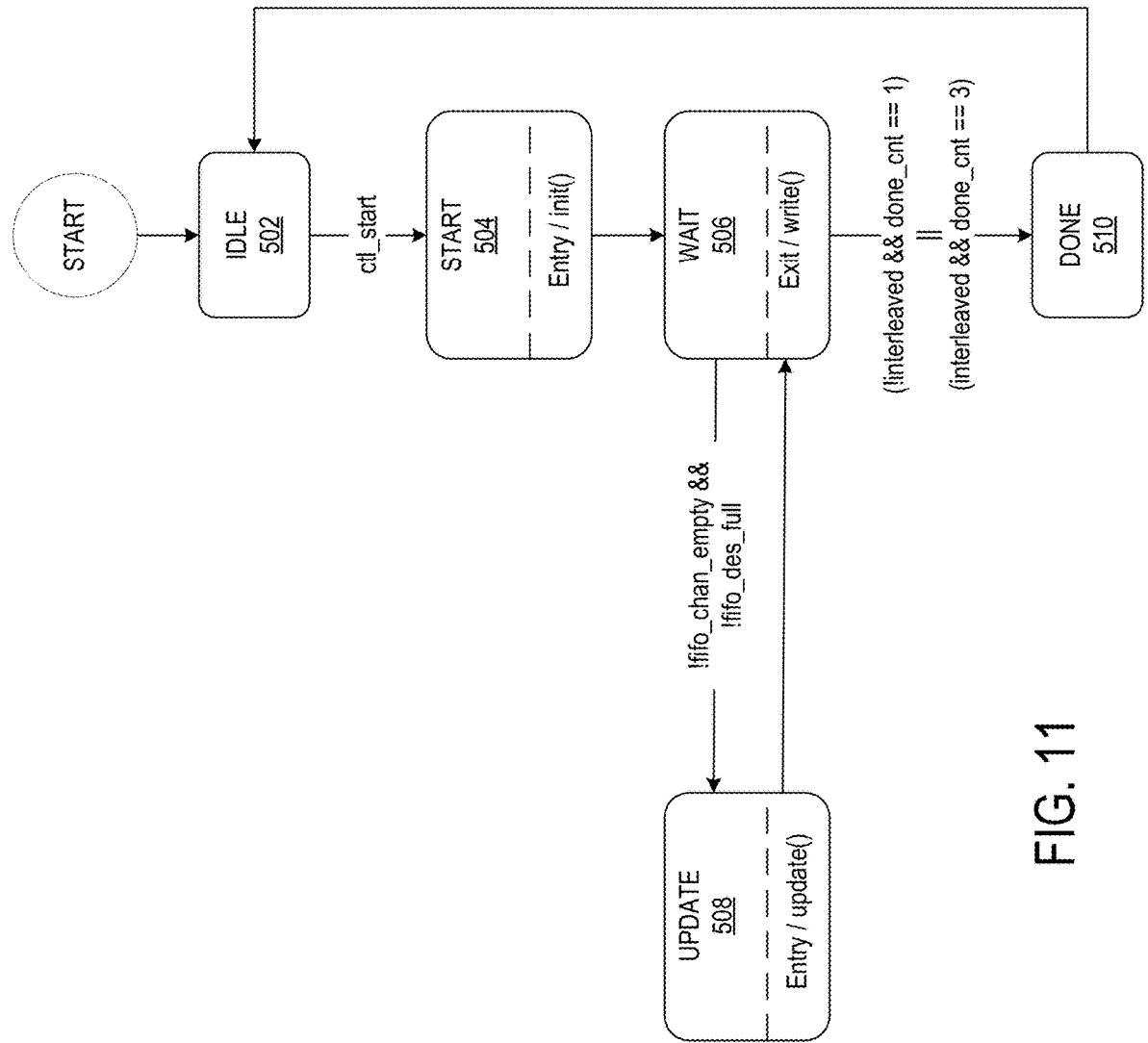
FIG. 11 is a state diagram that explains operation of the finite state machine of the write controller.

FIG. 11 is a state diagram that explains operation of the finite state machine 456 of the write controller 120. The finite state machine begins in idle state 502 and transitions to start state 504 in response to assertion of a control signal that indicates startup. In the start state, the finite state machine upon entry initializes base and offset addresses that reference parts of the target memory at which the different component values are to be stored. After initialization is complete, the finite state machine transitions to wait state 506.

The finite state machine stays in the wait state 506 until an MCU is ready to be processed. The exit criteria for moving to the update state 508 are that the channel FIFO buffer 454 is not empty and the descriptor FIFO 458 is not full. On entry to the update state, the finite state machine updates addressing information, generates a write command, and stores the command in the descriptor FIFO buffer. The finite state machine then transitions back to wait state 506. The finite state machine cycles between wait state 506 and update state 508 for processing the scan rows of the buffers 112, 114 or 116.

The finite state machine transitions from wait state 506 to done state 510 for non-interleaved MCUs if the done_count=1 (because each MCU has values of a single channel) or for interleaved MCUs if the done_count=3 (because each MCU has values of three channels). The finite state machine manages the done_count in the wait state to indicate which component buffer is being processed. The finite state machine returns to the idle state 502 from the done state 510.

Figure 12:
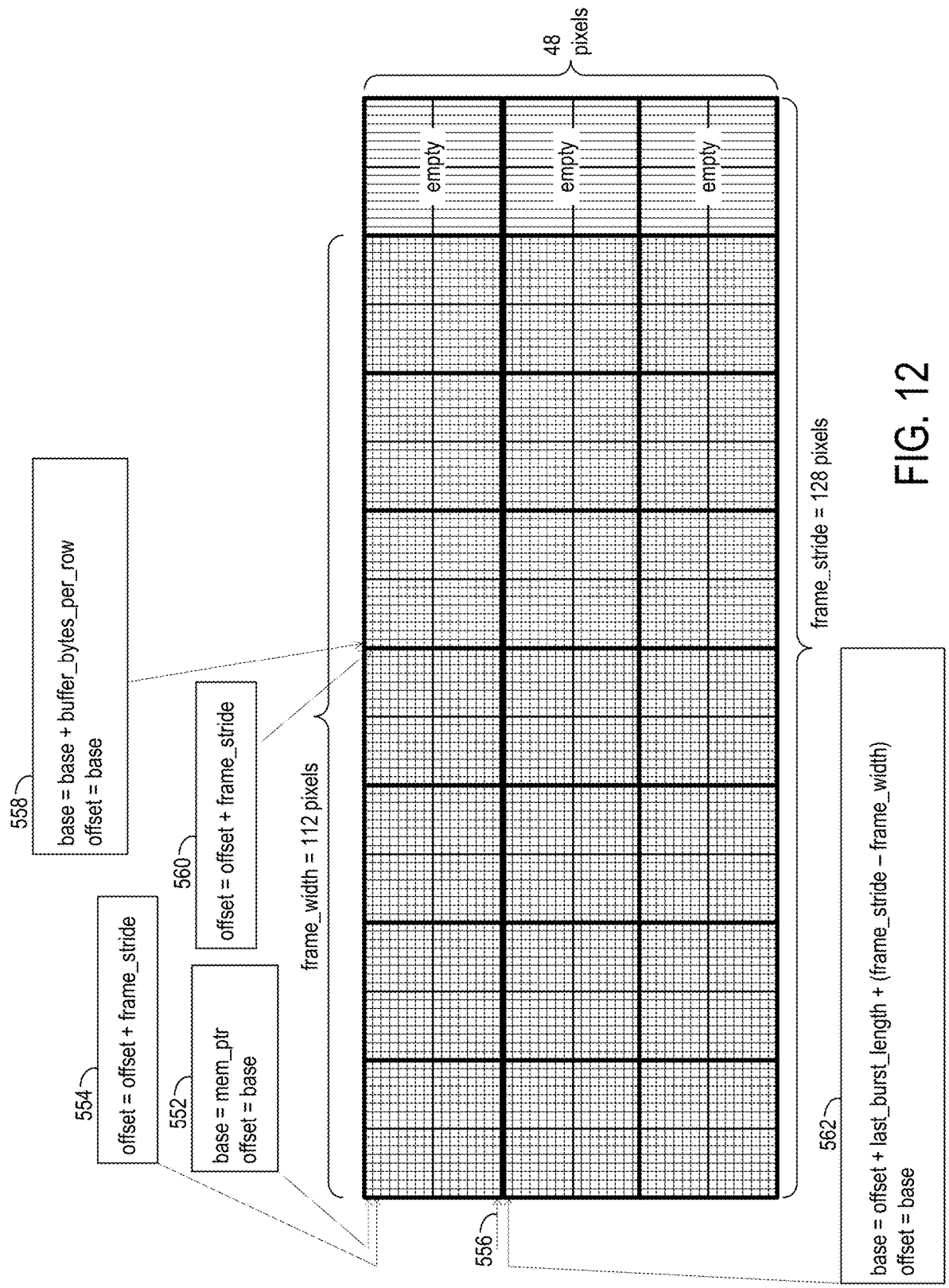
FIG. 12 shows an exemplary frame and address generation by the write controller.

FIG. 12 shows an exemplary frame and address generation by the write controller 120. The addressing is based on the example of FIG. 7. The address is explained by base and offset addresses of a frame of image data for one component.

At block 552, the base address is initially assigned mem_ptr, which is the starting address in memory of the frame, and the offset address is assigned the base address. Thus, the first burst write begins at the starting address of the frame.

At block 554, the next offset address is computed as the current offset address plus the frame stride. The frame stride can be a multiple of the width of the MCU buffer in component values. In the example, the frame stride is twice the width of the MCU buffer. Arrow 556 indicates starting address of the last burst write from the MCU buffer, and block 558 shows new base and offset addresses computed for the writing the next complete set of MCUs from the MCU buffer.

At block 558, the base address is incremented by the number of bytes per row of the MCU buffer. For example, for 8×8 blocks the base address can be incremented by 64. At block 560, the next offset address is computed as the current offset plus the frame stride.

Block 562 shows new base and offset addresses computed for writing the next complete set of MCUs from the MCU buffer. The base address is the current value of the offset address plus the length of the last burst plus the difference between the frame stride and the frame width. The frame width is the actual width of the frame in component values.

Figure 13:
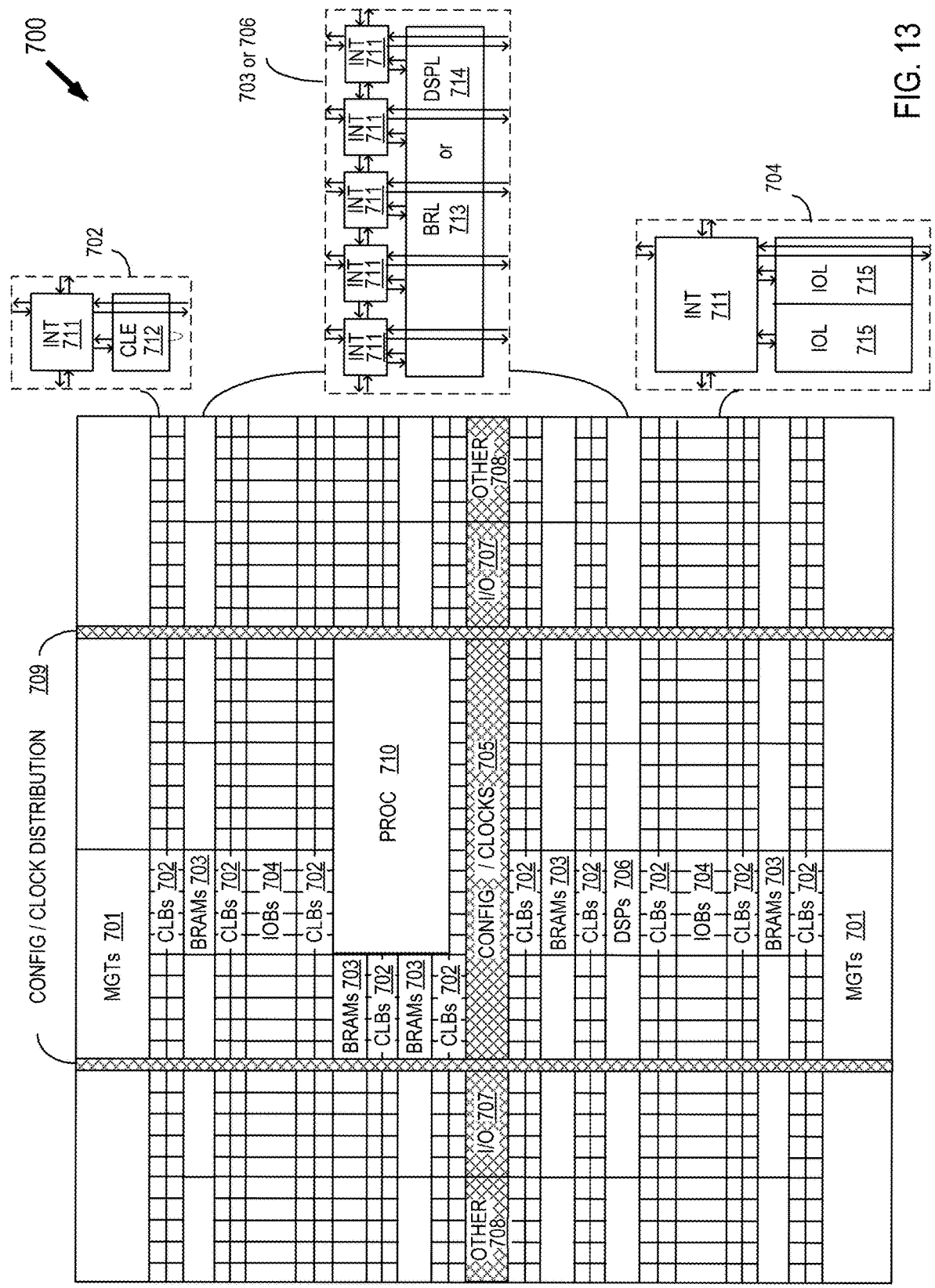
FIG. 13 shows a programmable integrated circuit (IC) on which the disclosed circuits and processes may be implemented.

FIG. 13 shows a programmable integrated circuit (IC) 700 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 13 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown). Circuits made consistent with the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 13.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 13) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 13 include additional logic blocks that disrupt the regular columnar structure making up a large part of the programmable IC. The additional logic blocks can be programmable blocks and/or dedicated logic. For example, the processor block PROC 710 shown in FIG. 13 spans several columns of CLBs and BRAMs.

Note that FIG. 13 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 13 are purely exemplary. For example, in an actual programmable IC, more than one adjacent column of CLBs is typically included wherever the CLBs appear, to facilitate the efficient implementation of user logic.

Figure 14:
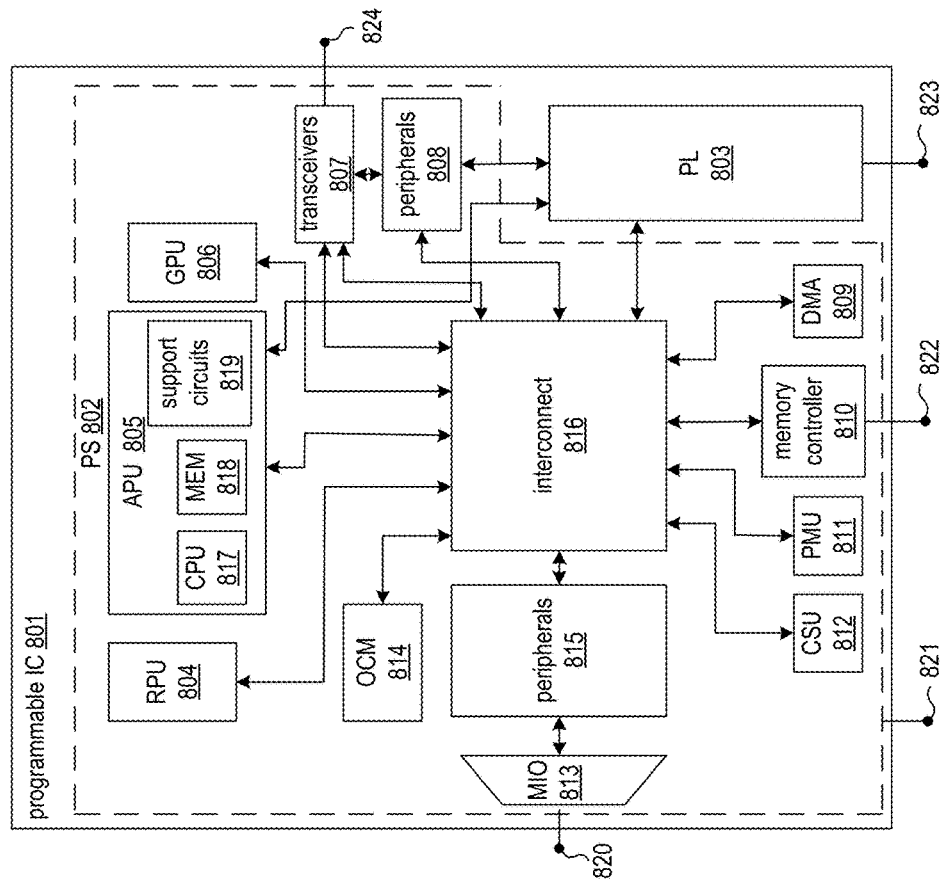
FIG. 14 is a block diagram depicting a System-on-Chip (SoC).

FIG. 14 is a block diagram depicting a System-on-Chip (SoC) 801. In the example, the SoC includes the processing subsystem (PS) 802 and the programmable logic subsystem 803. The processing subsystem 802 includes various processing units, such as a real-time processing unit (RPU) 804, an application processing unit (APU) 805, a graphics processing unit (GPU) 806, a configuration and security unit (CSU) 812, and a platform management unit (PMU) 811. The PS 802 also includes various support circuits, such as on-chip memory (OCM) 814, transceivers 807, peripherals 808, interconnect 816, DMA circuit 809, memory controller 810, peripherals 815, and multiplexed (MIO) circuit 813. The processing units and the support circuits are interconnected by the interconnect 816. The PL subsystem 803 is also coupled to the interconnect 816. The transceivers 807 are coupled to external pins 824. The PL 803 is coupled to external pins 823. The memory controller 810 is coupled to external pins 822. The MIO 813 is coupled to external pins 820. The PS 802 is generally coupled to external pins 821. The APU 805 can include a CPU 817, memory 818, and support circuits 819. The APU 805 can include other circuitry, including L1 and L2 caches and the like. The RPU 804 can include additional circuitry, such as L1 caches and the like. The interconnect 816 can include cache-coherent interconnect or the like.

Referring to the PS 802, each of the processing units includes one or more central processing units (CPUs) and associated circuits, such as memories, interrupt controllers, direct memory access (DMA) controllers, memory management units (MMUs), floating point units (FPUs), and the like. The interconnect 816 includes various switches, busses, communication links, and the like configured to interconnect the processing units, as well as interconnect the other components in the PS 802 to the processing units.

The OCM 814 includes one or more RAM modules, which can be distributed throughout the PS 802. For example, the OCM 814 can include battery backed RAM (BBRAM), tightly coupled memory (TCM), and the like. The memory controller 810 can include a DRAM interface for accessing external DRAM. The peripherals 808, 815 can include one or more components that provide an interface to the PS 802. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 815 can be coupled to the MIO 813. The peripherals 808 can be coupled to the transceivers 807. The transceivers 807 can include serializer/deserializer (SERDES) circuits, MGTs, and the like.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for converting image data between coded and raster formats. Other aspects and features will be apparent to those skilled in the art from consideration of the specification. The circuits and methods may be implemented as one or more processors configured to execute software, as an application specific integrated circuit (ASIC), as a logic on a programmable logic device, or combinations thereof. It is intended that the specification and drawings be considered as examples only, with a true scope of the invention being indicated by the following claims.

What is claimed is:

1. A circuit arrangement comprising:
    a first buffer configured for storage of M rows and N columns of first type component blocks of a frame, wherein M=a first vertical sampling factor, N=L*(a first horizontal sampling factor), L≥2, N<W, and W is a number of columns of blocks of pixels in the frame;
    a second buffer configured for storage of a plurality of second type component blocks of the frame;
    a demultiplexer circuit configured to:
        input the first type component blocks and the second type component blocks in coded block order, and
        enable storage of the first type component blocks in the first buffer and of the second type component blocks in the second buffer in the coded block order; and
    a multiplexer circuit configured to:
        flush data from the first buffer in raster scan order in response to a completed set of the first type component blocks in the first buffer, and
        flush data from the second buffer in raster scan order in response to a completed set of the second type component blocks in the second buffer.

2. The circuit arrangement of claim 1, further comprising:
    a third buffer configured for storage of third type component blocks of the frame;
    wherein the demultiplexer circuit configured to
        input the third type component blocks in the coded block order, and
        enable storage of the third type component blocks in the third buffer; and
    wherein the multiplexer circuit configured to flush data from the third buffer in raster scan order in response to a completed set of the third type component blocks in the third buffer.

3. The circuit arrangement of claim 2, wherein the first buffer stores luma blocks, the second buffer stores first type chroma blocks, and the third buffer stores second type chroma blocks.

4. The circuit arrangement of claim 2, wherein the first buffer stores red component blocks, the second buffer stores green component blocks, and the third buffer stores blue component blocks.

5. The circuit arrangement of claim 2, wherein the second buffer is configured for storage of M rows and N columns of the second type component blocks.

6. The circuit arrangement of claim 5, wherein the third buffer is configured for storage of M rows and N columns of the third type component blocks.

7. The circuit arrangement of claim 6, wherein:
    the first vertical sampling factor is a vertical sampling factor of the first type component blocks, and the first horizontal sampling factor is a horizontal sampling factor of the second type component blocks; and
    the circuit arrangement further comprises a control circuit configured to:
        input the first vertical and horizontal sampling factors, second vertical and horizontal sampling factors of the second type component blocks, and third vertical and horizontal sampling factors of the third type component blocks, and
        generate control signals to the demultiplexer circuit for accessing the first, second, and third buffers in response to values of the first, second, and third vertical and horizontal sampling factors.

8. The circuit arrangement of claim 7, wherein the control circuit includes:
    a row counter configured to increment and output indices of rows of the first, second, and third buffers, respectively;
    a column counter configured to increment and output indices of columns of the first, second, and third buffers, respectively; and
    a channel counter configured to increment and output a value that references one of the first, second, or third buffers.

9. The circuit arrangement of claim 1, wherein the vertical sampling factor is the vertical sampling factor of the first type component blocks.

10. The circuit arrangement of claim 1, wherein the first buffer and the second buffer include respective pairs of ping-pong buffers.

11. The circuit arrangement of claim 1, further comprising a write controller coupled to the multiplexer circuit, wherein the write controller is configured to:
  issue write requests of the data from the first buffer on a direct memory access (DMA) write channel of a data bus, the write requests having a burst length provided by the data bus; and
  issue write requests of the data from the second buffer of the burst length on the DMA write channel of the data bus.

12. The circuit arrangement of claim 1, wherein:
  the completed set of the first type component blocks in the first buffer is the first buffer being full or the first buffer having C columns of first type component blocks and P columns of padding blocks;
  the completed set of the second type component blocks in the second buffer (114) is the second buffer being full or the second buffer having C columns of first chroma type blocks and P columns of padding blocks; and $C \geq 1, P=(W \text{ modulo } N)$.

13. A circuit arrangement comprising:
  a first buffer configured for storage of M rows and N columns of first type component blocks of first type component data of a frame, wherein M=a vertical sampling factor, N=L*(a horizontal sampling factor), L≥2, N<W, and W is a number of columns of blocks of pixels in the frame;
  a second buffer configured for storage of a plurality of second type component blocks of second type component data of the frame;
  a demultiplexer circuit configured to:
    input in raster scan order, the first type component data and the second type component data, and
    enable storage in raster scan order of the first type component data in the first buffer;
    enable storage in raster scan order of the second type component data in the second buffer; and
  a multiplexer circuit configured to flush data from the first buffer and from the second buffer in coded block order.

14. A method comprising:
  inputting first type component blocks and second type component blocks in a coded block order to a demultiplexer circuit, wherein the first buffer is configured for storage of M rows and N columns of the first type component blocks of a frame, wherein M=a first vertical sampling factor, N=L*(a first horizontal sampling factor), L≥2, N<W, and W is a number of columns of blocks of pixels in the frame;
  enabling storage of the first type component blocks in the first buffer and of the second type component blocks in the second buffer in the coded block order by the demultiplexer circuit; and
  flushing data from the first buffer by a multiplexer circuit in raster scan order in response to a completed set of the first type component blocks in the first buffer; and
  flushing data from the second buffer by the multiplexer circuit in raster scan order in response to a completed set of the second type component blocks in the second buffer.

15. The method of claim 14, further comprising:
  inputting third type component blocks of the frame in the coded block order by the demultiplexer circuit;
  enabling storage of the third type component blocks in a third buffer by the demultiplexer circuit; and
  flushing data from the third buffer in raster scan order by the multiplexer circuit in response to a completed set of the third type component blocks in the third buffer.

16. The method of claim 15, wherein the enabling storage of the second type component blocks in the second buffer includes enabling storage of M rows and N columns of the second type component blocks in the second buffer.

17. The method of claim 16, wherein the enabling storage of the third type component blocks in the third buffer includes enabling storage of M rows and N columns of the third type component blocks in the third buffer.

18. The method of claim 17, wherein the first vertical sampling factor is a vertical sampling factor of the first type component blocks, and the first horizontal sampling factor is a horizontal sampling factor of the second type component blocks, and the method further comprising:
  inputting the first vertical and horizontal sampling factors, second vertical and horizontal sampling factors of the second type component blocks, and third vertical and horizontal sampling factors of the third type component blocks to a control circuit; and
  generating control signals by the control circuit to the demultiplexer circuit for accessing the first, second, and third buffers in response to values of the first, second, and third vertical and horizontal sampling factors.

19. The method of claim 14, wherein:
  the first buffer and the second buffer include respective pairs of ping-pong buffers;
  the enabling storage of the first type component blocks and the flushing data from the first buffer includes enabling storage of the first type component blocks in one buffer of the respective pair of ping-pong buffers while flushing the data from the other buffer of the respective pair of ping-pong buffers; and
  the enabling storage of the second type component blocks and the flushing data from the second buffer includes enabling storage of the second type component blocks in one buffer of the respective pair of ping-pong buffers while flushing the data from the other buffer of the respective pair of ping-pong buffers.

20. The method of claim 14, further comprising:
  issuing write requests of the data from the first buffer by a write controller on a direct memory access (DMA) write channel of a data bus, the write requests having a burst length provided by the data bus; and
  issuing write requests of the data from the second buffer of the burst length on the DMA write channel of the data bus by the write controller.

* * * * *